United States Patent
Kalyanaraman

(10) Patent No.: US 10,501,579 B2
(45) Date of Patent: Dec. 10, 2019

(54) POLY(AMIC ACID) SYNTHESIS AND CONVERSION TO HIGH MOLECULAR WEIGHT POLYIMIDE

(71) Applicant: SABIC Global Technologies B.V., Bergen op Zoom (NL)

(72) Inventor: Viswanathan Kalyanaraman, Newburgh, IN (US)

(73) Assignee: SABIC GLOBAL TECHNOLOGIES B.V., Bergenop Zoom (NL)

( * ) Notice: Subject to any disclaimer, the term of this patent is extended or adjusted under 35 U.S.C. 154(b) by 0 days.

(21) Appl. No.: 15/551,644

(22) PCT Filed: Feb. 18, 2016

(86) PCT No.: PCT/US2016/018435
§ 371 (c)(1),
(2) Date: Aug. 17, 2017

(87) PCT Pub. No.: WO2016/134126
PCT Pub. Date: Aug. 25, 2016

(65) Prior Publication Data
US 2018/0022873 A1 Jan. 25, 2018

Related U.S. Application Data

(60) Provisional application No. 62/118,565, filed on Feb. 20, 2015.

(51) Int. Cl.
C09D 179/08 (2006.01)
C08G 73/10 (2006.01)

(52) U.S. Cl.
CPC ..... *C08G 73/1032* (2013.01); *C08G 73/1017* (2013.01); *C09D 179/08* (2013.01)

(58) Field of Classification Search
None
See application file for complete search history.

(56) References Cited

U.S. PATENT DOCUMENTS

| | | | |
|---|---|---|---|
| 3,507,765 A | 4/1970 | Holub | |
| 4,428,977 A | 1/1984 | Peterson | |
| 4,480,088 A * | 10/1984 | Pike | C08G 73/1028 524/600 |
| 5,252,168 A * | 10/1993 | Johnston | C08J 3/03 156/307.4 |
| 5,430,096 A | 7/1995 | Hwang et al. | |
| 5,719,253 A | 2/1998 | Echigo et al. | |
| 6,333,391 B1 | 12/2001 | Laycock et al. | |
| 6,479,581 B1 * | 11/2002 | Ireland | C08G 73/14 428/364 |
| 7,300,972 B2 | 11/2007 | Ozawa et al. | |
| 2002/0151234 A1 * | 10/2002 | Ozawa | C08G 73/10 442/50 |
| 2009/0002961 A1 | 1/2009 | Camacho et al. | |
| 2009/0246392 A1 | 10/2009 | Miyamoto | |
| 2010/0056718 A1 | 3/2010 | Murakami et al. | |
| 2014/0213724 A1 * | 7/2014 | Miyamoto | C08G 73/1021 524/845 |
| 2014/0218875 A1 * | 8/2014 | Nakayama | C08G 73/1021 361/751 |
| 2014/0363687 A1 * | 12/2014 | Nakayama | C08J 5/18 428/473.5 |
| 2015/0166729 A1 * | 6/2015 | Miyamoto | C08G 73/1067 524/600 |

FOREIGN PATENT DOCUMENTS

| | | | |
|---|---|---|---|
| CN | 101412812 | 4/2009 | |
| EP | 2974801 A1 | 1/2016 | |
| JP | 2013-144751 A * | 7/2013 | ......... C08G 73/1021 |
| KR | 101056967 | 8/2011 | |
| WO | 2013105619 | 7/2013 | |

OTHER PUBLICATIONS

Yang et al. "A Water-Soluble Polyimide Precursor: Synthesis and Characterization of Poly(amic acid) Salt" Macromolecular Research, 12(3), 2004, 263-268. (Year: 2004).*
Chiefari et al. "Water as Solvent in Polyimide Synthesis: Thermoset and Thermoplastic Examples" High Performance Polymers 15, 269-279, 2003. (Year: 2003).*
Facinelli et al. "Controlled Molecular Weight Polyimides from Poly(amic acid) Salt Precursors" Macromolecules 1996, 29, 7342-7350. (Year: 1996).*
Machine translation of JP-2013144751, translation generated Jan. 2019, 24 pages. (Year: 2019).*
Chiefari et al. "Water as Solvent in Polyimide Synthesis II: Processable Aromatic Polyimides" High Performance Polymers 18, 31-44, 2006. (Year: 2006).*
International Search Report for International Application No. CT/US2016/018435; International Filing Date: Feb. 18, 2016; dated Apr. 28, 2016; 5 pages.
Written Opinion of the International Searching Authority for International Application No. PCT/US2016/18435; International Filing Date: Feb. 18, 2016; dated Apr. 28, 2016; 7 pages.

* cited by examiner

Primary Examiner — Robert S Loewe
(74) Attorney, Agent, or Firm — Cantor Colburn LLP

(57) ABSTRACT

A process is disclosed for synthesis of a poly(amic acid), including reacting a dianhydride and a diamine in the presence of a tertiary amine, tertiary ammonium salt, tertiary ammonium hydroxide, secondary amine, secondary ammonium salt, secondary ammonium hydroxide, quaternary ammonium salt, quaternary ammonium hydroxide, ammonium hydroxide, or a combination comprising at least one of the foregoing, in water, at a temperature of 60 C to 180 C, or 60 C to 100 C, or 100 C to 180 C, under an inert atmosphere, with agitation, to produce an aqueous poly (amic acid).

18 Claims, No Drawings

POLY(AMIC ACID) SYNTHESIS AND CONVERSION TO HIGH MOLECULAR WEIGHT POLYIMIDE

CROSS-REFERENCE TO RELATED APPLICATIONS

This application is a National Stage application of PCT/US2016/018435, filed Feb. 18, 2016, which claims benefit of U.S. Provisional Application No. 62/118,565 filed Feb. 20, 2015, both of which are incorporated by reference herein in their entirety.

BACKGROUND

Synthesis of polyimide generally proceeds by first producing a poly(amic acid) in an organic solvent. The poly(amic acid) is then converted to the polyimide by cyclization, eliminating water. However, the presence of organic solvent residue is not desired for some applications. There accordingly remains a need for polyimides having a low organic solvent content, and processes for the manufacture of such polyimides.

BRIEF DESCRIPTION

A process for synthesis of a poly(amic acid) is provided, reacting a dianhydride and a diamine in the presence of a tertiary amine, tertiary ammonium salt, tertiary ammonium hydroxide, secondary amine, secondary ammonium salt, secondary ammonium hydroxide, quaternary ammonium salt, quaternary ammonium hydroxide, ammonium hydroxide, or a combination comprising at least one of the foregoing, in water, at a temperature of 60° C. to 180° C., or 60° C. to 100° C., or 100° C. to 180° C., under an inert atmosphere, with agitation, to produce an aqueous poly(amic acid).

In another embodiment, a water-soluble polyimide precursor is provided, comprising the reaction product of a tetracarboxylic acid dianhydride component, an aromatic or aliphatic diamine component, and at least 0.65 moles of higher monoamine component per 1 mole of tetracarboxylic acid dianhydride component. In some embodiments the precursor is provided in the form of a homogenous solution.

DETAILED DESCRIPTION

It has been found by the inventors that manufacture of a poly(amic) acid in water with a minor amount of a higher monoamine as described herein can produce an aqueous solution of the poly(amic) acid. The poly(amic) acid can then be converted to polyimide by thermal or chemical processes. The method is efficient and provides a poly(amic) acid and a polyimide that contains no organic solvent or organic solvent residue. In another advantageous feature, the aqueous solution of the poly(amic) acid can be homogenous. In a still further advantage, the aqueous solution of the poly(amic) acid can applied to a substrate, and then cyclized to provide the polyimide directly on the substrate.

In particular, the process for synthesis of a poly(amic acid) comprises reacting a dianhydride and a diamine, in the presence of a higher monoamine, in water, at a temperature of 60° C. to 180° C., under an inert atmosphere with agitation, to produce the poly(amic acid).

The dianhydride can be of formula (1)

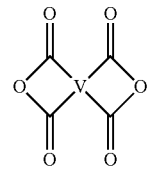

(1)

wherein V is a substituted or unsubstituted tetravalent $C_{4-40}$ hydrocarbon group, for example a substituted or unsubstituted $C_{6-20}$ aromatic hydrocarbon group, a substituted or unsubstituted, straight or branched chain, saturated or unsaturated $C_{2-20}$ aliphatic group, or a substituted or unsubstituted $C_{4-8}$ cycloalkylene group or a halogenated derivative thereof. In a preferred embodiment, the dianhydride is an aromatic dianhydride, in particular a substituted or unsubstituted $C_{6-20}$ aromatic hydrocarbon group, such as any of those of the formulas:

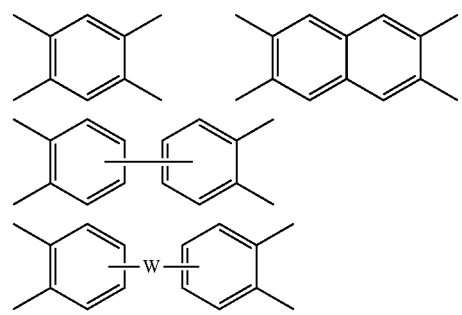

wherein W is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or a group of the formula T as described in formula (2) below.

A specific aromatic dianhydride is an aromatic bis(ether anhydride) of formula (2)

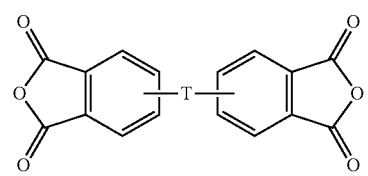

(2)

wherein T is —O— or a group of the formula —O—Z—O— wherein the divalent bonds of the —O— or the —O—Z—O— group are in the 3,3',3,4',4,3', or the 4,4' positions. The group Z in —O—Z—O— of formula (1) is also a substituted or unsubstituted divalent organic group, and can be an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded. Exemplary groups Z include groups derived from a dihydroxy compound of formula (3)

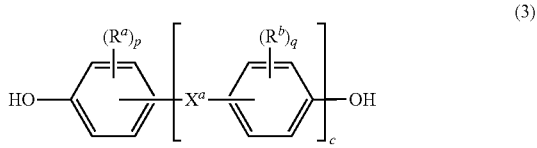

(3)

wherein $R^a$ and $R^b$ can be the same or different and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —SO$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (3a)

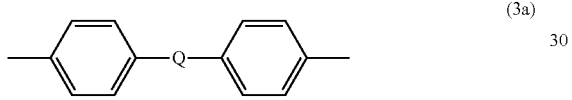

(3a)

wherein Q is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific embodiment Z is derived from bisphenol A, such that Q in formula (3a) is 2,2-isopropylidene.

Illustrative examples of dianhydrides include 3,3-bis[4-(3,4-dicarboxyphenoxy)phenyl]propane bisanhydride; 4,4'-bis(3,4-dicarboxyphenoxy)diphenyl ether bisanhydride; 4,4'-bis(3,4-dicarboxyphenoxy)diphenyl sulfide bisanhydride; 4,4'-bis(3,4-dicarboxyphenoxy)benzophenone bisanhydride; 4,4'-bis(3,4-dicarboxyphenoxy)diphenyl sulfone bisanhydride; 2,2-bis[4-(2,3-dicarboxyphenoxy)phenyl]propane bisanhydride (bisphenol A dianhydride, or BPA-DA); 4,4'-bis(2,3-dicarboxyphenoxy)diphenyl ether bisanhydride; 4,4'-bis(2,3-dicarboxyphenoxy)diphenyl sulfide bisanhydride; 4,4'-bis(2,3-dicarboxyphenoxy)benzophenone bisanhydride; 4,4'-bis(2,3-dicarboxyphenoxy)diphenyl sulfone bisanhydride; 4-(2,3-dicarboxyphenoxy)-4'-(3,4-dicarboxyphenoxy)diphenyl-2,2-propane bisanhydride; 4-(2,3-dicarboxyphenoxy)-4'-(3,4-dicarboxyphenoxy)diphenyl ether bisanhydride; 4-(2,3-dicarboxyphenoxy)-4'-(3,4-dicarboxyphenoxy)diphenyl sulfide bisanhydride; 4-(2,3-dicarboxyphenoxy)-4'-(3,4-dicarboxyphenoxy)benzophenone bisanhydride; 4,4'-(hexafluoroisopropylidene)diphthalic anhydride, and 4-(2,3-dicarboxyphenoxy)-4'-(3,4-dicarboxyphenoxy)diphenyl sulfone bisanhydride. A combination of different dianhydrides can be used.

In some embodiments the dianhydride is bisphenol A dianhydride, pyromellitic dianhydride, 3,3',4,4'-biphenyl dianhydride, 3,3',4,4'-benzophenone dianhydride, 3,3',4,4'-oxydiphthalic dianhydride, 1,4-bis(3,4 dicarboxyl phenoxy) benzene dianhydride, 1,3-bis(2,3-dicarboxyl phenoxy)benzene dianhydride, and 1,2,3,4-cyclobutanetetracarboxylic dianhydride. In some embodiments, the dianhydride is bisphenol A dianhydride. In some embodiments, a tetracarboxylic acid is used rather than the corresponding dianhydride form.

Any organic diamine suitable for the production of the desired polyimide can be used in particular an organic diamine of formula (4)

(4)

wherein R is a substituted or unsubstituted divalent $C_{1-20}$ hydrocarbon group, such as a substituted or unsubstituted $C_{6-20}$ aromatic hydrocarbon group, a substituted or unsubstituted, straight or branched chain, saturated or unsaturated $C_{2-20}$ alkylene group, or a substituted or unsubstituted $C_{3-8}$ cycloalkylene group, for example or halogenated derivative of any of the foregoing. In a preferred embodiment the organic diamine is an aromatic diamine, in particular a diamine wherein R divalent group of formula (5)

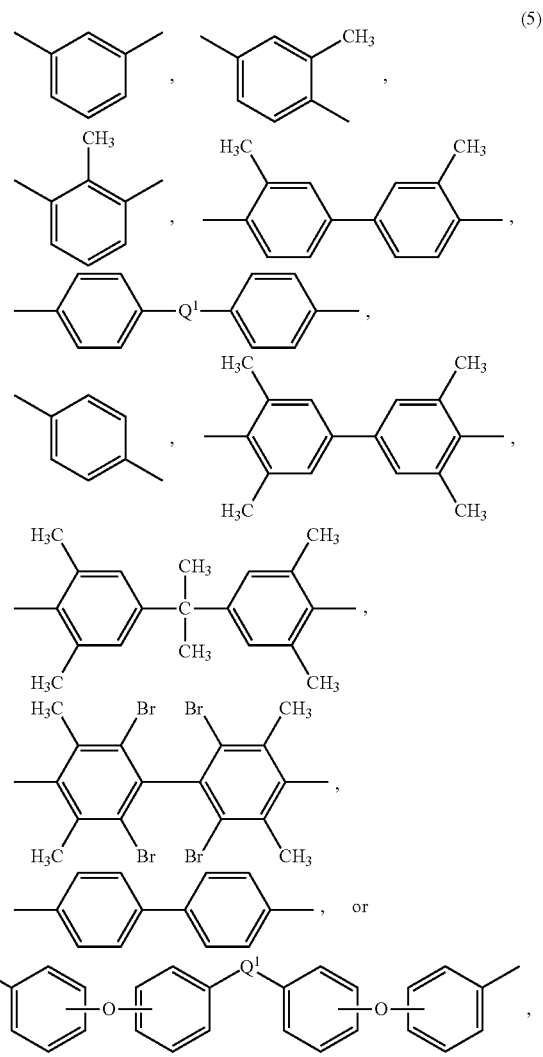

(5)

wherein $Q^1$ is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4.

Examples of suitable diamines are substituted or unsubstituted $C_{6-20}$ aromatic diamines and substituted or unsubstituted $C_{3-20}$ aliphatic diamines, including 1,4-butane diamine, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(b-amino-t-butyl) toluene, bis(p-b-amino-t-butylphenyl) ether, bis(p-b-methyl-o-aminophenyl) benzene, bis(p-b-methyl-o-aminopentyl) benzene, 1,3-diamino-4-isopropyl-benzene, bis(4-aminophenyl) sulfide, bis (4-aminophenyl) sulfone (also known as 4,4'-diaminodiphenyl sulfone (DDS)), bis(4-aminophenyl) ether and 1,3-bis(3-aminopropyl) tetramethyldisiloxane. Any regioisomer of the foregoing compounds can be used. $C_{1-4}$ alkylated or poly($C_{1-4}$) alkylated derivatives of any of the foregoing can be used, for example a polymethylated 1,6-hexanediamine. Combinations of these compounds can also be used. In some embodiments the organic diamine is m-phenylenediamine, p-phenylenediamine, 4,4'-diaminodiphenyl sulfone, 3,4'-diaminodiphenyl sulfone, 3,3'-diaminodiphenyl sulfone, or a combination comprising at least one of the foregoing.

In some embodiments, the organic diamine can include a polysiloxane diamine of formula (6)

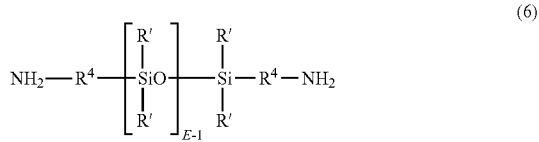

(6)

wherein each R' is independently a $C_{1-13}$ monovalent hydrocarbyl group. For example, each R' can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no halogens are present. Combinations of the foregoing R' groups can be used in the same copolymer. In an embodiment, the polysiloxane diamine comprises R' groups that have minimal hydrocarbon content, e.g., a methyl group. E in formula (6) has an average value of 5 to 100, and each $R^4$ is independently a $C_2$-$C_{20}$ hydrocarbon, in particular a $C_2$-$C_{20}$ arylene, alkylene, or arylenealkylene group. In an embodiment $R^4$ is a $C_2$-$C_{20}$ alkyl group, specifically a $C_2$-$C_{20}$ alkyl group such as propylene, and E has an average value of 5 to 100, 5 to 75, 5 to 60, 5 to 15, or 15 to 40. Procedures for making the polysiloxane diamines of formula (7) are well known in the art. The diamine component can contain 10 to 90 mole percent (mol %), or 20 to 50 mol %, or 25 to 40 mol % of polysiloxane diamine (6) and 10 to 90 mol %, or 50 to 80 mol %, or 60 to 75 mol % of diamine (4).

In some embodiments, the diamine is an aromatic diamine such as meta-phenylene diamine, para-phenylene diamine, diamino diphenyl ether, oxydianiline, 4,4'-diamino-3,3'-dimethyl diphenyl methane, 1,4-bis(4-amino phenoxy)benzene, 2,2'-bis(4-(4-aminophenoxy)phenyl)propane, diaminobenzoic acid, 3,3'-, 3,4', or 4,4'-diaminodiphenyl sulfone, or diaminobenzophenone. In some embodiments, the diamine is meta-phenylene diamine, para-phenylene diamine, 3,3'-, 3,4', or 4,4'-diaminodiphenylsulfone, or a combination comprising at least one of the foregoing.

The mole ratio of the dianhydride to the diamine can be 0.9:1.1 to 1.1:0.9, and is preferably equimolar.

Polymerization of the dianhydride is conducted in an aqueous solution comprising a tertiary amine, tertiary ammonium salt, tertiary ammonium hydroxide, secondary amine, secondary ammonium salt, secondary ammonium hydroxide, quaternary ammonium salt, quaternary ammonium hydroxide, or ammonium hydroxide. For convenience, these will be referred to herein collectively as "higher monoamines" The tertiary or secondary amines can be of the formula $R^gR^gR^hN$. The corresponding ammonium salt or ammonium hydroxide of the tertiary or second amines can be used, i.e., a compound of the formula $R^gR^gR^hNH^+$ $^-X$. It is also possible to use a quaternary salt or ammonium hydroxide of the formula $(R^g)_4NH^+$ $^-X$.

In each of the foregoing formulas, each $R^g$ can be the same or different, and is independently a $C_{1-18}$ alkyl, $C_{1-18}$ alkoxy, $C_{2-18}$ heteroalkyl, $C_{1-18}$ alkenyl, $C_{2-18}$ heteroalkenyl, $C_{3-8}$ cycloalkyl, $C_{6-12}$ aryl, $C_{6-12}$ aryloxy, $C_{6-12}$ heteroaryl, $C_{7-18}$ alkylarylene, or $C_{7-18}$ arylalkylene, each of which can be substituted or unsubstituted; and $R^h$ is hydrogen, $C_{1-18}$ alkyl, $C_{1-18}$ heteroalkyl, $C_{1-18}$ alkenyl, $C_{2-18}$ heteroalkenyl, $C_{3-8}$ cycloalkyl, $C_{6-12}$ aryl, $C_{6-12}$ heteroaryl, $C_{7-19}$ alkylarylene, or $C_{7-19}$ arylalkylene, each of which can be substituted or unsubstituted. In some embodiments $R^g$ is independently a $C_{1-14}$ alkyl, $C_{2-12}$ alkenyl, $C_{6-12}$ aryl, $C_{7-12}$ alkylarylene, or $C_{7-12}$ arylalkylene, each of which can be substituted or unsubstituted; and $R^h$ is hydrogen, $C_{1-8}$ alkyl, $C_{2-12}$ alkenyl, $C_{6-12}$ aryl, $C_{7-13}$ alkylarylene, or $C_{7-13}$ arylalkylene, each of which can be substituted or unsubstituted. In some embodiments, one $R^g$ or $R^h$ or all of $R^g$ and $R^h$ is substituted with a hydroxy. In the salts or ammonium hydroxides, X is an anion, and can be organic or inorganic, for example an acetate, citrate, halide, sulfate, phosphate, or hydroxide. Preferably the anion is hydroxide, to minimize the amount of halide or other moiety in the product.

For example, the higher monoamine can be triethylamine, triethanolamine, tributylamine, dimethyldodecylamine, ammonium hydroxide, triallylamine, tetramethylammonium hydroxide, tetraethylammonium hydroxide, tetrapropylammonium hydroxide, tetrabutylammonium hydroxide, dibutylamine, dimethylethanolamine, or a combination comprising at least one of the foregoing. In some embodiments, the higher monoamine is a secondary or tertiary amine, or the corresponding ammonium hydroxide. In some embodiments, the tertiary amine is triethylamine and secondary amine is dibutylamine.

The amount of the higher monoamine is selected to provide one or more of the desired reactivity between the dianhydride and the diamine and the desired solubility of the poly(amic) acid product in the aqueous solvent, and will accordingly depend on the specific compounds selected and the higher monoamine used. The amount of the higher monoamine can be 0.2 moles to 2.0 moles, or 0.6 moles to 1.5 moles, per 1 mole of diamine. In some embodiments, about 0.66 moles of triethylamine per 1 mole of bisphenol A dianhydride is used. In some embodiments, the amount of the higher monoamine is greater than 0.643 moles of monoamine per mole of dianhydride, for example up to 1.5, or up to 1.0 mole of higher monoamine per mole of dianhydride. Alternatively, the amount of the higher monoamine content can be greater than 0.3215 mole equivalent of monoamine per mole equivalent of dianhydride.

As stated above, reaction (polymerization) of the dianhydride and the diamine in the presence of the higher monoamine occurs in water as a reaction medium. In preferred embodiments, substantially no other solvent is present in the reaction medium, to minimize or eliminate any residual organic solvent in the product. Use of water as a reaction medium is further less costly, and requires no special environmental considerations. In an advantageous aspect, the reaction medium and the poly(amic acid) composition contain substantially no halogenated solvent such as chloroform, dichloromethane, dichlorobenzene, or chlorobenzene, which makes the product suitable for applications where environmental concerns make organic solvents unsuitable. In another advantageous aspect, the reaction medium contains substantially no high boiling solvents (>105° C. boiling point) such as N-methyl pyrrolidone, dimethylacetamide, dimethylformamide, or cyclohexanone, which can be difficult to remove from product. Accordingly, the reaction medium preferably comprises at least 95 volume percent (vol. %) water, more preferably at least 98 vol. % water, and even more preferably at least 99 vol. % water. In the most preferred embodiments, no reaction medium other than water is present, for example no halogenated or high boiling point solvent is present.

The dianhydride and diamine components are present in the reaction medium in an amount effective to provide the desired solids content of the product poly(amic acid). As used herein the term "solids content" refers to the amount of product poly(amic acid) versus the total weight of the product and the reaction medium on a weight basis. The dianhydride and diamine components are present in the reaction medium in an amount effective to provide a solids content of the poly(amic acid) of be 2% to 80% by weight. Alternatively, the dianhydride and diamine components are present in the reaction medium in an amount effective to provide a solids content of the poly(amic acid) of 10% to 60%, or 20% to 50% or 30% to 40% by weight.

The order of addition of the various polymerization components can vary. In some embodiments, the higher monoamine is added to the reaction medium first, followed by sequential or simultaneous addition of the dianhydride and the diamine. In some aspects, the dianhydride is added to the aqueous reaction medium in the presence of the higher monoamine, and then the diamine is added to the combination. In another embodiment, the diamine is added to with the aqueous composition in the presence of the higher monoamine, and then the dianhydride is added to the combination. In other embodiments, the higher monoamine is combined with the reaction medium, and then both the dianhydride and diamine are added to the combination.

The polymerization is conducted at a temperature of 60° C. to 180° C. In some embodiments, the polymerization is conducted at 60° C. to 100° C., or at 70° C. to 90° C., or at 60° C. to 80° C. In another embodiment, the polymerization is conducted at 100° C. to 180° C., or at 110° C. to 160° C., or at 120° C. to 140° C. It is also possible to use a ramped temperature profile during the polymerization.

The polymerization is further conducted under an inert atmosphere with agitation. The inert atmosphere can be provided by a blanket of nitrogen, argon, or the like. Agitation can be via shaking, stirring, bubbling an inert gas, or other method known in the art.

The pressure during polymerization can vary. In some embodiments, the polymerization reaction is maintained at 0 to 100 pounds per square inch ("PSI") (0 to 689 kiloPascal (kPa)) pressure.

In some embodiments an end-capping agent is present during the reaction to control the molecular weight of the poly(amic) acids and thus the polyimides formed from the poly(amic) acids. In some embodiments, the end-capping agent is a monofunctional anhydride or monofunctional primary amine such as phthalic anhydride, aniline, maleic anhydride, nadic anhydride, or a combination comprising at least one of the foregoing. It is to be understood that the monofunctional amines used as end-capping agents, such as aniline, are distinguishable from the above-described monoamines because the end-capping agents are primary amines, not a quaternary, tertiary, or secondary amine. The amount of endcapping agent is adjusted to provide the desired molecular weight.

The poly(amic acid) as produced in the reaction medium can be isolated and recovered according to known techniques. In an embodiment, to isolate the poly(amic acid), the reaction medium containing the poly(amic acid) product is acidified, for example an organic or inorganic acid is added in an amount effective to neutralize the higher monoamine and precipitate the polymer. In another embodiment, the as-produced aqueous poly(amic acid) can be spray-dried in the presence of inert hot gas to isolate a poly(amic acid) powder. The poly(amic acid) powder can then be used as is known in the art, for example to produce a polyimide.

Alternatively, the aqueous poly(amic acid) can be stored, treated (for example extracted), or used directly. The aqueous poly(amic acid) can be used for a variety of purposes, for example as an additive to other compositions, or as an intermediate in the production of a polyimide. In an embodiment, the aqueous poly(amic acid) is directly cyclized to form a polyimide. A process for producing a polyimide comprising heating and devolatilizing the aqueous poly (amic acid). Devolatilizing can be take place in a single or double screw extruder, wiped film evaporator, thin film evaporator, or other apparatus as is known in the art. In another embodiment of the method, instead of a heating step, treatment with a chemical cyclization agent is conducted. The chemical cyclization agent may be a conventional agent which has been used for converting polyamic acid to polyimide. Examples of the chemical cyclization agents include pyridine, acetic acid anhydride, trimethylamine, and benzoic acid.

In some embodiments, a water-soluble polyimide precursor comprising the reaction product of a tetracarboxylic acid dianhydride component, an aromatic or aliphatic diamine component, and at least 0.65 moles of higher monoamine component per 1 mole of tetracarboxylic acid dianhydride component is provided. The aqueous poly(amic acid) can be used as a coating for a substrate, for example a fiber sizing, protective coating, or film-forming formulation. Because the aqueous poly(amic acid) can be produced as a homogeneous solution in the reaction medium, the coatings can be readily and evenly applied in the desired amount. The coated poly(amic acid) can subsequently cyclized to a polyimide to form a conformal polyimide coating. In a preferred embodiment, the coating can be thin, for example 1 micrometers to 1 millimeter, or 10 micrometers to 1 millimeter, or 100 micrometers to 1 millimeter. Cyclization can be by known methods, for example, heating or reaction with a chemical cyclization agent.

The polyimide produced by the above method can have a weight average molecular weight of greater than 10,000 Daltons, or greater than 50,000 Daltons, and a polydispersity index of less than 4.0 and more preferably less than 3.0.

The polyimide formed from the poly(amic acid) comprise more than 1, for example 5 to 1000, or 5 to 500, or 10 to 100 structural units of formula (8)

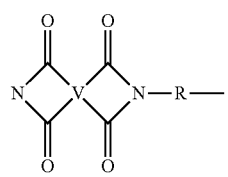

(8)

wherein each V is the same or different, and is as defined in formula (1), and each R is the same or different, and is defined as in formula (4). The polyetherimides comprise more than 1, 5 to 1000, or 5 to 500, or 10 to 100 structural units of formula (9)

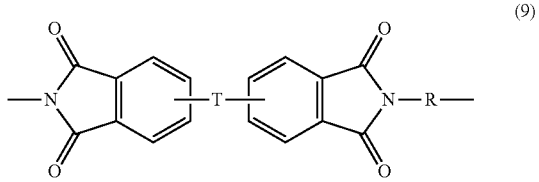

(9)

wherein each T is the same or different, and is as described in formula (2), and each R is the same or different, and is as

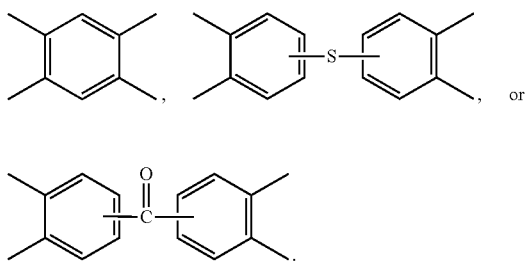

described in formula (4), preferably m-phenylene or p-phenylene. The polyetherimides can optionally further comprises up to 10 mole %, up to 5 mole %, or up to 2 mole % of units of formula (8) wherein V is a linker of the formula In some embodiments no units are present wherein V is of these formulas.

In an embodiment in formula (9), R is m-phenylene or p-phenylene and T is —O—Z—O— wherein Z is a divalent group of formula (3a). Alternatively, R is m-phenylene or p-phenylene and T is —O—Z—O wherein Z is a divalent group of formula (3a) and Q is 2,2-isopropylidene.

In some embodiments, the polyetherimide can be a polyetherimide sulfone. For example, the polyetherimide can comprise the etherimide units wherein at least 10 mole percent, for example 10 to 90 mole percent, 10 to 80 mole percent, 20 to 70 mole percent, or 20 to 60 mole percent of the R groups comprise a sulfone group. For example, R can be 4,4'-diphenylene sulfone, and Z can be 4,4'-diphenylene isopropylidene, providing units of the following formula

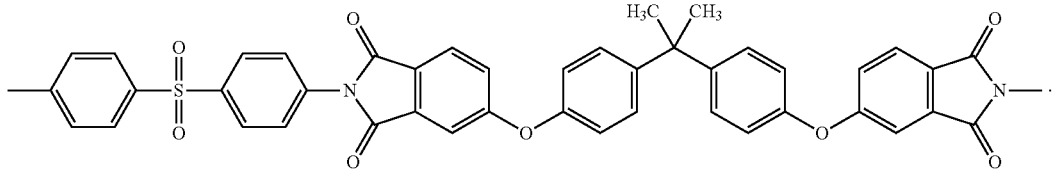

In another embodiment the polyetherimide can be a polyetherimide-siloxane block or graft copolymer. Block polyimide-siloxane copolymers comprise imide units and siloxane blocks in the polymer backbone. Block polyetherimide-siloxane copolymers comprise etherimide units and siloxane blocks in the polymer backbone. The imide or etherimide units and the siloxane blocks can be present in random order, as blocks (i.e., AABB), alternating (i.e., ABAB), or a combination thereof. Graft copolymers are non-linear copolymers comprising the siloxane blocks connected to linear or branched polymer backbone comprising imide or etherimide blocks. In some embodiments, a polyetherimide-siloxane has units of the formula

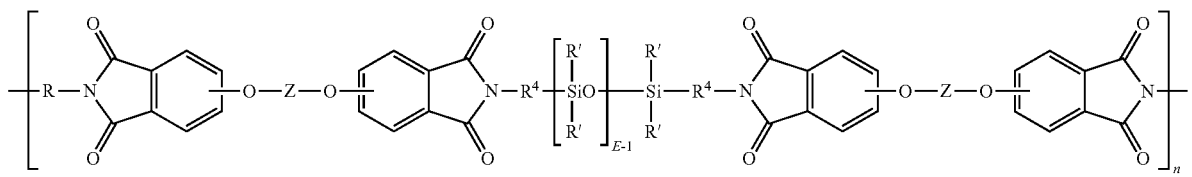

wherein R' and E of the siloxane are as in formula (6), the R and Z of the imide are as in formula (1), $R^4$ is the same as $R^4$ as in formula (7), and n is an integer from 5 to 100. In a specific embodiment, the R of the etherimide is a phenylene, Z is a residue of bisphenol A, $R^4$ is n-propylene, E is 2 to 50, 5, to 30, or 10 to 40, n is 5 to 100, and each R' of the siloxane is methyl. In some embodiments the polyetherimide-siloxane comprises 10 to 50 weight %, 10 to 40 weight %, or 20 to 35 weight % polysiloxane units, based on the total weight of the polyetherimide-siloxane.

The invention is further illustrated by the following non-limiting Examples.

EXAMPLES

The following materials were used in the Examples.

| MATERIAL | DESCRIPTION | SOURCE |
|---|---|---|
| BPA-DA | Bisphenol A dianhydride | SABIC |
| PPD | Para-phenylene diamine | DuPont |
| MPD | Meta-phenylene diamine | DuPont |
| DDS | Diaminodiphenylsulfone | |
| TEA | Triethylamine | Fisher Scientific |
| MA | Maleic anhydride | Alfa Aesar |
| DBA | Dibutylamine | Aldrich |
| DMEA | Dimethyl ethanolamine | Acros Organics |

Molecular Weight Analysis.

A sample of poly(amic acid) was heated in an oven or in a glass tube to 380° C. in the presence of nitrogen to remove the water and amine. This heating process also converts the poly(amic acid) to corresponding polyimide polymer. The polyimide was dissolved in methylene chloride or 50:50 (wt/wt) hexafluoroisopropyl alcohol:methylene chloride mixture and the molecular weight of the polyimide was analyzed by gel permeation chromatography using polystyrene standards as a reference.

Thermal Analysis.

The Tg of the dried polymer was analyzed by a differential scanning calorimeter (DSC). DSC was conducted under nitrogen from 40° C. to 350° C. with 20° C./minute ramp rate. Polymerization process above 100° C.

Dianhydride (BPA-DA) and end-capping agent were taken in a glass pressure tube reactor rated to withstand 100 PSI (689 kPa) (along with necessary amounts of deionized water (DI water) and higher monoamine. The slurry was agitated using a magnetic stir bar. The glass tube was pressurized using nitrogen gas (10 PSI (68.9 kPa) to 50 PSI (345 kPa)) and heated above 100° C. using an oil bath. Once the contents were completely dissolved, the pressure was relieved and an equimolar amount of diamine (MPD, PPD, or DDS) was added to the reactor. The reactor was pressurized with nitrogen gas to 50 PSI (345 kPa) and heated in an oil bath above 100° C. to form the poly(amic acid).

Molecular Weight and PDI Calculations.

In the following Tables, Mz refers to a Z-average molecular weight, a qualitative measure of branching/cross linking of polymers, and described, for example, in U.S. Pat. No. 7,514,516. Higher Mz/Mw means more branching/cross-linking. An Mz/Mw of less than 2.0 indicates very low levels of branching or cross-linking.

Table 1 shows the results of polymerization of BPA-DA with diamines in the presence of DI water and the higher monoamine (TEA) at 100° C. After BPA-DA and end-capping agent (phthalic anhydride ("PA")) were dissolved in DI water in presence of the higher monoamine, the diamine was added to the reactor. Polymerization time was measured after diamine was added to the reaction mixture. The resulting poly(amic acid) solution was homogeneous. The molecular weight data is based on the polyimide obtained by ring closing the poly(amic acid) solution at 380° C. for 15 min.

TABLE 1

| Ex. | BPA-DA (g) | Diamine | (g) | PA (g) | DI H$_2$O (g) | TEA (g) | Polymerization Temp./time (° C.)/(min) | | Mw | Mn | PDI | Mz/Mw | Solids (%) |
|---|---|---|---|---|---|---|---|---|---|---|---|---|---|
| 1a | 80 | MPD | 16.66 | 0.5 | 80 | 20 | 100 | 60 | 40802 | 17558 | 2.32 | 1.73 | 49 |
| 1b | 80 | MPD | 16.66 | 0.5 | 80 | 20 | 100 | 120 | 42140 | 18724 | 2.26 | 1.67 | |
| 1c | 80 | MPD | 16.66 | 0.5 | 80 | 20 | 100 | 180 | 49627 | 20536 | 2.42 | 1.79 | |
| 1d | 80 | MPD | 16.66 | 0.5 | 80 | 20 | 100 | 240 | 49831 | 19567 | 2.55 | 1.86 | |
| 2a | 80 | PPD | 16.66 | 0.5 | 80 | 20 | 100 | 60 | 63335 | 27675 | 2.29 | 1.63 | 49 |
| 2b | 80 | PPD | 16.66 | 0.5 | 80 | 20 | 100 | 180 | 62865 | 27678 | 2.27 | 1.66 | |
| 2c | 80 | PPD | 16.66 | 0.5 | 80 | 20 | 100 | 240 | 68062 | 30257 | 2.25 | 1.62 | |

Polymerization Using a Helicone Mixer.

Equimolar amounts of dianhydride and diamine along with the end-capping agent, DI water, and higher monoamine were taken together in the helicone mixer. The mixer was purged with nitrogen gas and closed tightly. The mixer was heated to 130 to 140° C. which produced 15 to 20 PSI (103 to 138 kPa) pressure. After 30 to 60 minutes, the pressure was relieved and the contents were taken above 300° C. for 30 to 60 minutes while continuously removing the water and amine After most of the liquids were removed, vacuum was applied for 10 to 20 minutes to remove the residual amount of amine. The polymer melt was removed from the Helicone mixer and analyzed for molecular weight and residual amine.

Thermal Conversion of Poly(Amic Acid) to Polyimide.

About 5 g of the poly(amic acid) was heated at 380° C. in a glass tube in the presence of nitrogen to remove the water and amine and to form the polyimide.

Measurement of Triethylamine Residuals in Polyimide.

The triethylamine residue in the polyimide was measured by thermal desorption gas chromatography-mass spectroscopy (GC-MS).

Table 2 shows molecular weight control by phthalic anhydride end-capping agent, polymerization of BPA-DA with diamines in presence of DI water and monoamine at 140° C. and 50 PSI (345 KPa) pressure. After BPA-DA and end-capping agent was dissolved in DI water in the presence of the higher monoamine (TEA), the diamine was added to the reactor. Polymerization time was measured after diamine was added to the reaction mixture. The resulting poly(amic acid) solution was homogeneous. The molecular weight data is based on the polyimide obtained by ring closing the poly(amic acid) solution at 380° C. for 15 min.

TABLE 2

| Ex. | BPA-DA (g) | Diamine | (g) | PA (g) | DI H$_2$O (g) | TEA (g) | Polymerization Temp./time (° C.)/(min) | | Mw | Mn | PDI | Mz/Mw | Tg (° C.) |
|---|---|---|---|---|---|---|---|---|---|---|---|---|---|
| 3 | 8 | MPD | 1.66 | 0.05 | 8 | 2 | 140 | 15 | 53649 | 22509 | 2.38 | 1.66 | 220.1 |
| 4 | 8 | PPD | 1.66 | 0.05 | 8 | 2 | 140 | 20 | 57463 | 26279 | 2.19 | 1.63 | 230.4 |
| 5 | 8 | DDS | 3.82 | 0.05 | 4 | 2 | 140 | 15 | 60532 | 30330 | 2 | 1.45 | 249.4 |

Table 3 shows molecular weight control by phthalic anhydride end-capping agent, polymerization of BPA-DA with diamines in the presence of DI water and monoamine at 140° C. and 50 PSI (345 KPa) pressure. After BPA-DA and end-capping agent was dissolved in DI water in presence of the higher monoamine (TEA), the diamine was added to the reactor. Polymerization time was measured after diamine was added to the reaction mixture. The resulting poly(amic acid) solution was homogeneous. The molecular weight data is based on the polyimide obtained by ring closing the poly(amic acid) solution at 380° C. for 15 min.

TABLE 3

| Ex. | BPA-DA (g) | Diamine (g) | PA (g) | DI H$_2$O (g) | TEA (g) | Polymerization Temp./time (° C.)/(min) | | Mw | Mn | PDI | Mz/Mw | solids |
|---|---|---|---|---|---|---|---|---|---|---|---|---|
| 6 | 8 | MPD | 1.66 | 0 | 8 | 2 | 140 | 15 | 106743 | 35505 | 3 | 2.04 | 49% |
| 7 | 8 | MPD | 1.66 | 0.025 | 8 | 2 | 140 | 15 | 61617 | 24796 | 2.48 | 1.79 | 49% |
| 8 | 8 | MPD | 1.66 | 0.05 | 8 | 2 | 140 | 15 | 53649 | 22509 | 2.38 | 1.66 | 49% |
| 9 | 8 | MPD | 1.66 | 0.075 | 8 | 2 | 140 | 15 | 42428 | 19855 | 2.13 | 1.58 | 49% |

Table 4 shows molecular weight control by maleic anhydride end-capping agent, polymerization of BPA-DA with diamines in the presence of DI water and monoamine at 140° C. and 50 PSI (345 kPa) pressure. After BPA-DA and end-capping agent was dissolved in DI water in the presence of the higher monoamine (TEA), the diamine was added to the reactor. Polymerization time was measured after diamine was added to the reaction mixture. The resulting poly(amic acid) solution was homogeneous. The molecular weight data is based on the polyimide obtained by ring closing the polyamic acid solution at 380° C. for 15 min.

TABLE 4

| Ex. | BPA-DA (g) | Diamine (g) | MA (g) | DI H$_2$O (g) | TEA (g) | Polymerization Temp./time (° C.)/(min) | | Mw | Mn | PDI | Mz/Mw | solids |
|---|---|---|---|---|---|---|---|---|---|---|---|---|
| 10 | 8 | MPD | 1.666 | 0 | 3 | 2 | 140 | 30 | 97828 | 34405 | 2.84 | 2.04 | 66% |
| 11 | 8 | MPD | 1.666 | 0.02 | 3 | 2 | 140 | 30 | 73845 | 29117 | 2.54 | 1.84 | 66% |
| 12 | 8 | MPD | 1.666 | 0.04 | 3 | 2 | 140 | 30 | 67174 | 26949 | 2.49 | 1.78 | 66% |
| 13 | 8 | MPD | 1.666 | 0.048 | 3 | 2 | 140 | 30 | 51154 | 21327 | 2.4 | 1.75 | 66% |
| 14 | 8 | MPD | 1.666 | 0.056 | 3 | 2 | 140 | 30 | 42904 | 18643 | 2.3 | 1.68 | 66% |
| 15 | 8 | MPD | 1.666 | 0.0696 | 3 | 2 | 140 | 30 | 35260 | 35260 | 2.67 | 1.78 | 66% |

Table 5 shows results from the polymerization of BPA-DA with diamines in the presence of DI water and monoamine at 140° C. and 50 PSI (345 kPa) pressure. The minimum level of amine needed for keeping the final polymer in solution was evaluated. After BPA-DA and the end-capping agent (PA) was dissolved in DI water in the presence of the higher monoamine (TEA), the diamine was added to the reactor. Polymerization time was measured after diamine was added to the reaction mixture. For example 16, the resulting poly(amic acid) solution was homogeneous, whereas in examples 17 and 18, the resulting poly(amic acid) precipitated out of solution. The molecular weight data is based on the polyimide obtained by ring closing the poly(amic acid) solution at 380° C. for 15 min.

TABLE 5

| Ex. | BPA-DA (g) | Diamine (g) | PA (g) | DI H$_2$O (g) | TEA (g) | Polymerization Temp./time (° C.)/(min) | | Mw | Mn | PDI | Mz/Mw | Solution | solids |
|---|---|---|---|---|---|---|---|---|---|---|---|---|---|
| 16 | 8 | MPD | 1.66 | 0.05 | 2 | 1.2 | 140 | 30 | 53950 | 23501 | 2.3 | 1.64 | Homogeneous | 75% |
| 17 | 8 | MPD | 1.66 | 0.05 | 2 | 1 | 140 | 30 | | | | | Precipitate | 76% |
| 18 | 8 | MPD | 1.66 | 0.05 | 8 | 0 | 140 | 30 | | | | | Precipitate | 55% |

Table 6 shows results from polymerization of BPA-DA with diamines in the presence of DI water and amine at 140° C. and 50 PSI (345 kPa) pressure. A secondary monoamine (dibutylamine "DBA") was used for comparison. After BPA-DA and end-capping agent (PA) was dissolved in DI water in the presence of the higher monoamine, diamine was added to the reactor. Polymerization time was measured after diamine was added to the reaction mixture. The resulting poly(amic acid) solution was homogeneous. The molecular weight data is based on the polyimide obtained by ring closing the poly(amic acid) solution at 380° C. for 15 minutes.

TABLE 6

| Ex. | BPA-DA (g) | Diamine (g) | PA end cap (g) | DI H₂O (g) | DBA (g) | Polymerization Temp./time (° C.)/(min) | | Mw | Mn | PDI | Mz/Mw | solids |
|---|---|---|---|---|---|---|---|---|---|---|---|---|
| 19 | 8 | MPD | 1.66 | 0.05 | 2 | 2.45 | 140 | 30 | 47539 | 19525 | 2.43 | 1.66 | 69% |

Table 7 shows results from polymerization of BPA-DA with meta-phenylene diamine in the presence of DI water and dimethylethanolamine (DMEA) at 140° C. After BPA-DA and end-capping agent (PA) were dissolved in DI water in presence of the higher monoamine, the diamine was added to the reactor. Polymerization time was measured after diamine was added to the reaction mixture. The resulting poly(amic acid) solution was homogeneous. The molecular weight data is based on the polyimide obtained by ring closing the poly(amic acid) solution at 380° C. for 15 minutes.

TABLE 7

| Ex. | BPA-DA (g) | Diamine (g) | PA end cap (g) | DI H₂O (g) | amine DMEA (g) | Polymerization Temp./time (° C.)/(min) | | Mw | Mn | PDI | Mz/Mw | Solids % |
|---|---|---|---|---|---|---|---|---|---|---|---|---|
| 20 | 16 | MPD | 3.32 | 0.08 | 8 | 4 | 140 | 30 | 51157 | 23530 | 2.17 | 1.78 | 61.5 |

Table 8 shows results from polymerization of BPA-DA with diamines in the presence of DI water and monoamine (TEA) at 140° C. (closed vessel) in a Helicone vessel scale up, using PA or aniline ("AN") as an end-capping agent. All the components were taken in a Helicone mixer and heated to 130 to 140° C. to effect polymerization to poly(amic acid), which produced 15 to 20 PSI (103 to 138 kPa) pressure. After 30 to 60 minutes, the pressure was relieved and the contents were taken to above 300° C. for 30 to 60 minutes to effect cyclization to the polyimide while continuously removing water and amine After most of the solvents were removed, vacuum was applied for 10 to 20 minutes to remove residual amounts of amine. The polymer melt was taken from the Helicone and analyzed for molecular weight and residual amine

TABLE 8

| Ex. | BPA-DA (g) | Diamine (g) | End cap (g) | DI H₂O (g) | TEA (g) | Polymeriz. Temp./time (° C.)/(min) | | Cycliz. Temp./time (° C.)/(min) | | Residual removal time* (min) | Mw | PDI | Mz/Mw | Mn | Residual TEA in polymer (ppm) |
|---|---|---|---|---|---|---|---|---|---|---|---|---|---|---|---|
| 21 | 2500 | MPD | 520.05 | PA 14.64 | 2081 | 648.5 | 140 | 20 | 412 | 30 | 20 | 89995 | 2.72 | 2.02 | 33063 | 9.00 |
| 22 | 2700 | MPD | 570.42 | PA 39.85 | 1354 | 675 | 130 | 10 | 320 | 30 | 10 | 46407 | 2.12 | 1.56 | 21913 | 80.00 |
| 23 | 2730 | MPD | 575.5 | PA 54.94 | 1450 | 225 | 140 | 10 | 320 | 60 | 10 | 41822 | 2.06 | 1.51 | 20276 | 7.00 |
| 24 | 3000 | MPD | 601.26 | AN 29.52 | 1361 | 500 | 140 | 15 | 350 | 60 | 15 | 48251 | 2.13 | 1.55 | 22612 | 29.00 |
| 25 | 3030 | PPD | 634 | PA 44.3 | 1361 | 500 | 140 | 15 | 400 | 90 | 15 | 58212 | 2.11 | 1.53 | 27636 | ** |

*under 4 mm Hg vacuum
**Not detectable

The invention is further illustrated by the following embodiments, which do not limit the claims.

Embodiment 1. A process for synthesis of a poly(amic acid), the process comprising: reacting a dianhydride and a diamine in the presence of a tertiary amine, tertiary ammonium salt, tertiary ammonium hydroxide, secondary amine, secondary ammonium salt, secondary ammonium hydroxide, quaternary ammonium salt, quaternary ammonium hydroxide, ammonium hydroxide, or a combination comprising at least one of the foregoing, in water, at a temperature of 60° C. to 180° C., or 60° C. to 100° C., or 100° C. to 180° C., under an inert atmosphere, with agitation, to produce an aqueous poly(amic acid).

Embodiment 2. The process of claim 1, wherein the dianhydride is bisphenol A dianhydride, pyromellitic dianhydride, 3,3',4,4'-biphenyl dianhydride, 3,3',4,4'-benzophenone dianhydride, 3,3',4,4'-oxydiphthalic dianhydride, 1,4-bis(3,4 dicarboxyl phenoxy)benzene dianhydride, 1,3-bis(2,3-dicarboxyphenoxy)benzene dianhydride, 1,2,3,4-cyclobutanetetracarboxylic dianhydride, or a combination comprising at least one of the foregoing; preferably wherein the dianhydride is bisphenol A dianhydride.

Embodiment 3. The process of anyone or more of the preceding claims, wherein the diamine is meta-phenylene diamine, para-phenylene diamine, 4,4'-diaminodiphenylene ether, oxydianiline, 4,4'-diamino-3,3'-dimethyl diphenyl methane, 1,4-bis(4-aminophenoxy) benzene, 2,2'-bis(4-(4-amino phenoxy)phenyl)propane, 3,3'-diaminodiphenylene sulphone, 4,4'-diaminodiphenylene sulphone, 3,4'-diamino-diphenylene sulphone, or a combination comprising at least one of the foregoing; preferably wherein the diamine is meta-phenylene diamine, para-phenylene diamine, 4,4'-diaminodiphenylene sulfone, or a combination comprising at least one of the foregoing.

Embodiment 4. The process of any one or more of the preceding claims, wherein the higher monoamine is triethylamine, triethanolamine, tributylamine, dimethyldodecylamine, ammonium hydroxide, triallylamine, tetramethylammonium hydroxide, tetraethylammonium hydroxide, tetrapropylammonium hydroxide, tetrabutylammonium hydroxide, dibutylamine, dimethylethanolamine, or a combination comprising at least one of the foregoing amines; preferably wherein the tertiary amine is triethylamine.

Embodiment 5. The process of any one or more of the preceding claims, wherein the higher monoamine content is greater than 0.3215 mole equivalent per mole equivalent of dianhydride; or wherein the higher monoamine content is greater than 0.643 moles per mole of dianhydride, more preferably wherein the higher monoamine content is greater than 0.65 moles of higher monoamine component per mole of dianhydride.

Embodiment 6. The process of any one or more of the preceding claims, wherein an end-capping agent is present during the reacting; preferably wherein the end-capping agent is phthalic anhydride, aniline, maleic anhydride, nadic anhydride, or a combination comprising at least one of the foregoing.

Embodiment 7. The process of any one or more of the preceding claims, wherein the reacting is at a pressure of 0 to 685 kPa.

Embodiment 8. The process of any one or more of the preceding claims, wherein the reacting is in the absence of a halogenated solvent, a solvent having a boiling point greater than 105° C., or both, preferably wherein the reacting is in the absence of any organic solvent.

Embodiment 9. The process of any one or more of claims 1 to 8, comprising combining the dianhydride, the water, and the higher monoamine; and then adding the diamine.

Embodiment 10.The process of any one or more of the claims 1 to 8, comprising combining the diamine, the water composition and the higher monoamine; and then adding the dianhydride.

Embodiment 11. The process of any one or more of the preceding claims, comprising combining the higher monoamine with the water; and then adding the dianhydride, or the diamine, or both.

Embodiment 12. The process of any one or more of the preceding claims, wherein the aqueous poly(amic acid) is a homogenous solution.

Embodiment 13. A composition comprising the aqueous poly(amic acid) formed by the method any one or more of claims 1 to 12.

Embodiment 14. The process of any one or more of claims 1 to 12, further comprising neutralizing the aqueous poly (amic acid) to precipitate the poly(amic acid).

Embodiment 15. The process of any one or more of claims 1 to 12, further comprising spray drying the aqueous poly (amic acid) to isolate a poly(amic acid) powder.

Embodiment 16. A process for producing a polyimide, comprising cyclizing the poly(amic acid) of any one or more of claims 1 to 15.

Embodiment 17. The process of claim 16, wherein the polyimide has at least one of a weight average molecular weight of greater than 10,000 Daltons, a polydispersity index of less than 3.0, or a residual amine content less than 10 ppm.

Embodiment 18. A process for producing a polyimide coating, comprising contacting a substrate with the poly(amic acid) aqueous solution of any one or more of claims 1 to 13; and cyclizing the poly(amic acid) to form the polyimide coating.

Embodiment 19. The process of claim 18, wherein the substrate is a fiber.

All cited patents, patent applications, and other references are incorporated herein by reference in their entirety.

In general, the invention may alternatively comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %," is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. "Or" means "and/or." The terms "a" and "an" and "the" herein do not denote a limitation of quantity, and are to be construed to cover both the singular and the plural, unless otherwise indicated herein or clearly contradicted by context. Reference throughout the specification to "one embodiment," "another embodiment", "some embodiments," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

As used herein, the term "alkyl" refers to a straight or branched chain, saturated monovalent hydrocarbon group; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms; "aryl" refers to an aromatic monovalent group containing only carbon in the aromatic ring or rings; "arylene" refers to an aromatic divalent group containing only carbon in the aromatic ring or rings; "alkylarylene" refers to an aryl group that has been substituted with an alkyl group, with 4-methylphenyl being an exemplary alkylarylene group; "arylalkylene" refers to an alkyl group that has been substituted with an aryl group, with benzyl being an exemplary arylalkylene group; "acyl" refers to an alkyl group with the indicated number of carbon atoms attached through a carbonyl carbon bridge (—C(=O)—); "alkoxy" refers to an alkyl group with the indicated number of carbon atoms attached through an oxygen bridge (—O—); "aryloxy" refers to an aryl group with the indicated number of carbon atoms attached through an oxygen bridge (—O—); and the prefix "hetero" means that 1, 2, or 3 carbon atoms are replaced with a heteroatom (P, S, Si, O, or N).

The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Groups that can be present on a "substituted" position are cyano, hydroxyl, halogen, nitro, alkanoyl (such as a $C_{2-6}$ alkanoyl group such as acyl), carboxamido, $C_{1-8}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy, $C_{6-10}$ aryloxy such as phenoxy, $C_{1-6}$ alkylthio, $C_{1-6}$ or $C_{1-3}$ alkylsulfinyl, $C_{1-6}$ or $C_{1-3}$ alkylsulfonyl, $C_{6-12}$ aryl, $C_{7-19}$ arylalkylene having 1 to 3 separate or fused rings and from 6 to 12 ring carbon atoms; or arylalkoxy having 1 to 3 separate or fused rings and from 6 to 18 ring carbon atoms, with benzyloxy being an exemplary arylalkoxy.

While the invention has been described with reference to a specific embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A process for synthesis of a poly(amic acid), the process comprising:
reacting a dianhydride and a diamine in the presence of a higher monoamine comprising tertiary amine, tertiary ammonium salt, tertiary ammonium hydroxide, secondary amine, secondary ammonium salt, secondary ammonium hydroxide, quaternary ammonium salt, quaternary ammonium hydroxide, ammonium hydroxide, or a combination comprising at least one of the foregoing, in a reaction medium comprising at least 95 volume percent water, at a temperature of 80° C. to 180° C., under an inert atmosphere, with agitation, to produce an aqueous poly(amic acid).

2. The process of claim 1,
wherein the dianhydride is bisphenol A dianhydride, pyromellitic dianhydride, 3,3',4,4'-biphenyl dianhydride, 3,3',4,4'-benzophenone dianhydride, 3,3',4,4'-oxydiphthalic dianhydride, 1,4-bis(3,4 dicarboxyl phenoxy)benzene dianhydride, 1,3-bis(2,3-dicarboxyphenoxy)benzene dianhydride, 1,2,3,4-cyclobutanetetracarboxylic dianhydride, or a combination comprising at least one of the foregoing.

3. The process of claim 1, wherein the diamine is meta-phenylene diamine, para-phenylene diamine, 4,4'-diaminodiphenylene ether, oxydianiline, 4,4'-diamino-3,3'-dimethyl diphenyl methane, 1,4- bis(4-aminophenoxy) benzene, 2,2'-bis(4-(4-amino phenoxy)phenyl)propane, 3,3'-diaminodiphenylene sulphone, 4,4'-diaminodiphenylene sulphone, 3,4'-diaminodiphenylene sulphone, or a combination comprising at least one of the foregoing.

4. The process of claim 1,
wherein the higher monoamine is triethylamine, triethanolamine, tributylamine, dimethyldodecylamine, ammonium hydroxide, triallylamine, tetramethylammonium hydroxide, tetraethylammonium hydroxide, tetrapropylammonium hydroxide, tetrabutylammonium hydroxide, dibutylamine, dimethylethanolamine, or a combination comprising at least one of the foregoing amines.

5. The process of claim 1,
wherein the higher monoamine content is greater than 0.3215 mole equivalent per mole equivalent of dianhydride.

6. The process of claim 1,
wherein an end-capping agent is present during the reacting.

7. The process of claim 1, wherein the reacting is at a pressure of 0 to 685 kPa.

8. The process of claim 1, wherein the reacting is in the absence of a halogenated solvent, a solvent having a boiling point greater than 105° C., or both.

9. The process of claim 1, comprising combining the dianhydride, the water, and the higher monoamine; and then adding the diamine.

10. The process of claim 1, comprising combining the diamine, the water composition and the higher monoamine; and then adding the dianhydride.

11. The process of claim 1, comprising combining the higher monoamine with the water; and then adding the dianhydride, or the diamine, or both.

12. The process of claim 1, wherein the aqueous poly (amic acid) is a homogenous solution.

13. The process of claim 1, further comprising neutralizing the aqueous poly(amic acid) to precipitate the poly(amic acid).

14. The process of claim 1, further comprising spray drying the aqueous poly(amic acid) to isolate a poly(amic acid) powder.

15. A process for producing a polyimide, comprising cyclizing the poly(amic acid) formed by the method of claim 1.

16. The process of claim 15, wherein the polyimide has at least one of a weight average molecular weight of greater than 10,000 Daltons, a polydispersity index of less than 3.0, or a residual amine content less than 10 ppm.

17. A process for producing a polyimide coating, comprising
contacting a substrate with the poly(amic acid) aqueous solution of formed by the method of claim 1; and
cyclizing the poly(amic acid) to form the polyimide coating.

18. The process of claim 17, wherein the substrate is a fiber.

* * * * *